(12) United States Patent
Binkowski et al.

(10) Patent No.: US 7,549,668 B2
(45) Date of Patent: Jun. 23, 2009

(54) INTEGRAL HITCH AND BEAM

(75) Inventors: Joseph Binkowski, Wilmington, NC (US); Christian Holl, Holland, MI (US)

(73) Assignee: Hydro Automotive Structures North America, Inc., Holland, MI (US)

( * ) Notice: Subject to any disclaimer, the term of this patent is extended or adjusted under 35 U.S.C. 154(b) by 189 days.

(21) Appl. No.: 11/231,331

(22) Filed: Sep. 20, 2005

(65) Prior Publication Data

US 2007/0063482 A1  Mar. 22, 2007

(51) Int. Cl.
*B60D 1/14* (2006.01)
(52) U.S. Cl. .................................. 280/495; 280/504
(58) Field of Classification Search ............ 280/495, 280/504
See application file for complete search history.

(56) References Cited

U.S. PATENT DOCUMENTS

| | | | | |
|---|---|---|---|---|
| 5,511,813 A | * | 4/1996 | Kravitz | 280/495 |
| 5,620,198 A | * | 4/1997 | Borchers | 280/507 |
| 6,173,984 B1 | * | 1/2001 | Kay | 280/495 |
| 6,234,512 B1 | * | 5/2001 | Bettenhausen | 280/491.1 |
| 6,428,031 B1 | * | 8/2002 | McCoy et al. | 280/495 |
| 6,443,474 B1 | * | 9/2002 | Kay | 280/457 |
| 6,601,868 B1 | * | 8/2003 | McCoy et al. | 280/495 |
| 6,669,223 B2 | * | 12/2003 | Sekaria et al. | 280/495 |
| 2004/0021295 A1 | * | 2/2004 | Westerdale | 280/495 |

* cited by examiner

*Primary Examiner*—Paul N Dickson
*Assistant Examiner*—Michael R Stabley
(74) *Attorney, Agent, or Firm*—Robert J. SayFie

(57) ABSTRACT

A unitary or integral hitch and beam, which is a single unit that can be installed on vehicles of varying dimensions. The integral hitch and beam may reduce manufacturing time, weight, and parts, thus reducing cost of vehicles with hitches. The beam is cut to length depending on the rail distance of the motor vehicle.

5 Claims, 5 Drawing Sheets

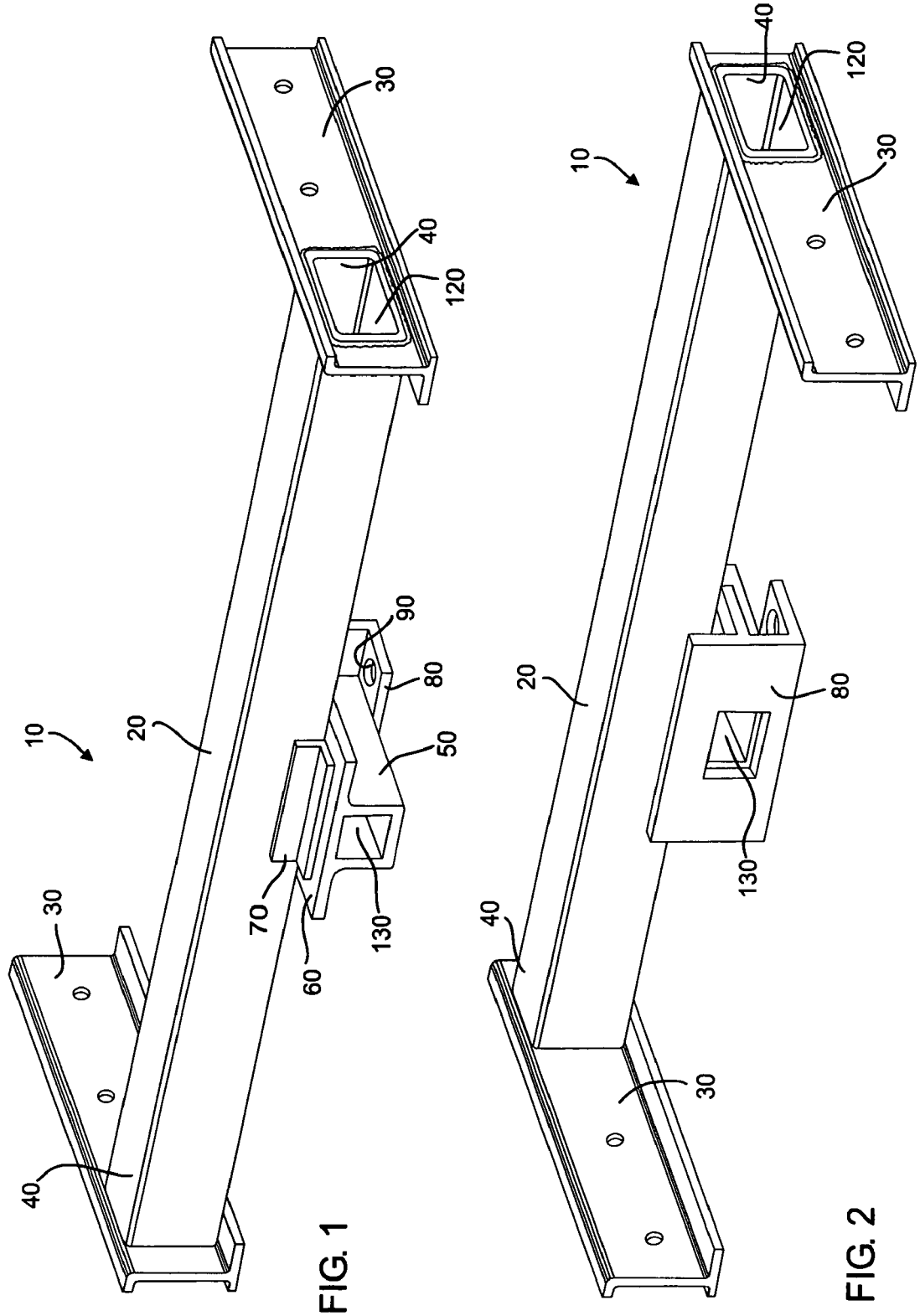

INTEGRAL HITCH AND BEAM

BACKGROUND OF THE INVENTION

This invention relates to a vehicle trailer hitch, and more particularly to a modular trailer hitch composed of extruded aluminum.

Vehicles use trailer hitches to tow trailers or other vehicles. Several different types of hitches exist, including, rear mounted, front mounted, or $5^{th}$ wheel hitches. Trailer hitches must sustain shear, tensile and compressive forces. Trailer hitches are sized and manufactured to transfer forces between the vehicles to which they are connected. Trailer hitches typically have one portion that is permanently secured to a vehicle, and another portion to which the trailer is detachably secured. Some trailer hitches have a cross-beam member attached to the vehicle frame and a hitch receiver nested in the cross-beam. Prior art trailer hitches are constructed of different components, that are usually steel, and each component must be secured to others.

U.S. Pat. No. 6,669,223 ("the '223 patent") discloses a trailer hitch having "Ends of the strut tube are flattened . . . " as described in the abstract and in FIGS. 1 and 2 of the '223 patent. The '223 patent hitch assembly is manufactured from an extruded U-shaped tube having an oval cross-section with flattened ends housing a cast hitch receiver; thus requiring an alloy having a good formability to avoid fracture during forming operations. This is usually not obtainable with common high strength aluminum alloys. The '223 patent requires a newly formed tube for accommodating vehicles with different rail spacing. The beam is fastened to the vehicle at flattened portions (20) via bolt holes (18). Also, the '223 patent discloses a bolt connection to fasten the receiver to a frame member or bumper system. The flattened portions (20) result in the beam having a reduced mechanical moment of inertia, thus the bolted connections (through bolt holes (18)) are only effective in transferring shear loads, and primarily shear loads in the horizontal plane. The connections (using bolt holes (18)) are not effective in sustaining vertical loads. Therefore the '223 patent may require a supplementary bolted connection from the receiver to a vehicle structural member that can hold the hitch towing load in the vertical direction.

Due to the worldwide volume of motor vehicle usage, a minor decrease in the cost to produce a beam with a trailer hitch; a minor decrease in the weight of a single beam with a trailer hitch; or a minor decrease in the production time of a single beam with a trailer hitch, can be a significant savings in cost and resources.

As can be seen, there is a need for a light weight trailer hitch system with a reduced number of steps to manufacture, and a reduced cost to manufacture. There is also a need for a hitch and beam that can support shear, vertical, and horizontal hitch loads without additional supporting structures.

SUMMARY OF THE INVENTION

An aspect of the present invention is an integral hitch and beam, comprising: a beam having two end sections; a rail member securely disposed at each of said end section; and a receiver securely disposed at said beam between said end sections.

Another aspect of the present invention is a method of An integral hitch and beam for securing to a vehicle, comprising: a beam having two end sections; a rail member having a beam receiving aperture; a receiver having a connection plate, said connection plate having a bolt aperture; a first reinforcement member secured to both said connection plate and said beam; and a second reinforcement member secured to both said receiver and said beam, second reinforcement member having a bracket aperture therethrough, said bracket aperture capable for receiving a safety chain therethrough.

These and other features, aspects and advantages of the present invention will become better understood with reference to the following drawings, description and claims.

BRIEF DESCRIPTION OF THE DRAWINGS

FIG. 1 is a pictorial front view of an exemplary embodiment of the integral hitch and beam of the present invention;

FIG. 2 is a pictorial rear view of an exemplary embodiment of the integral hitch and beam of the present invention;

DETAILED DESCRIPTION OF THE INVENTION

Figure 3:
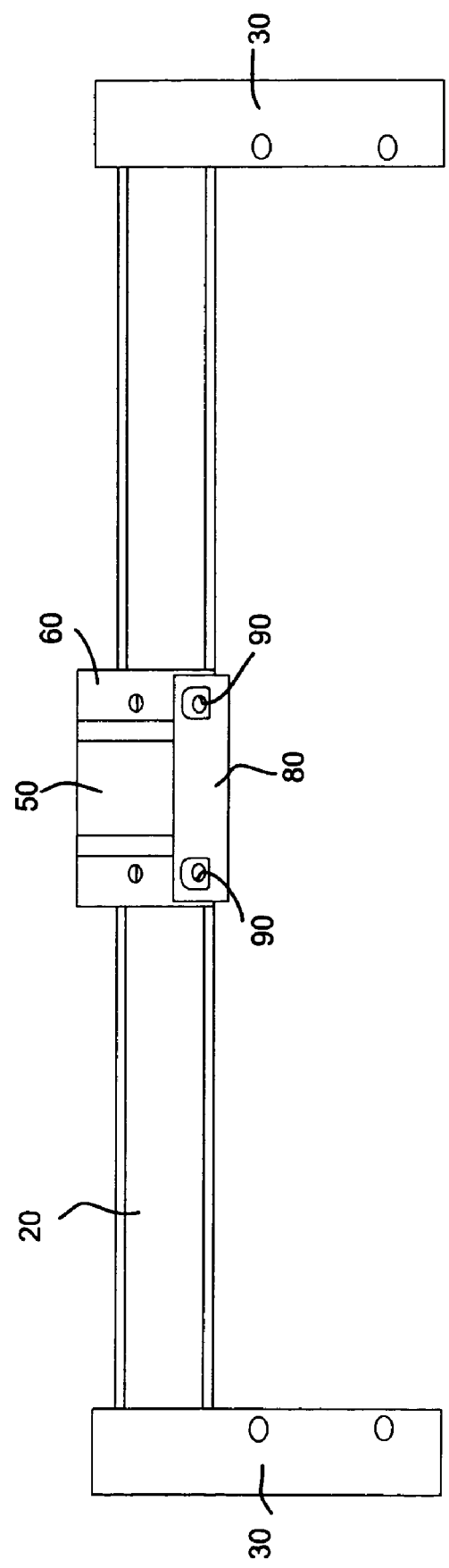
FIG. 3 is a pictorial bottom view of an exemplary embodiment of the integral hitch and beam of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

FIG. 1 illustrates an exemplary embodiment of the integral hitch and beam 10. The beam 20 has two opposed end sections 40, and a receiver 50 disposed therebetween. Each end section 40 may be secured to a rail member 30 via a beam receiving aperture 120 of the rail member 30. In one exemplary embodiment the beam receiving aperture 120 may be defined by a rectangular shape; thus each respective end section 40 may also be of a rectangular shape to fit within the beam receiving aperture 120. In one exemplary embodiment, the end sections 40 may be secured within the beam receiving aperture 120 by a weld that secures the end section 40 to the rail member 30 at the beam receiving aperture 120. In one exemplary embodiment the weld may secure the end section 40 to the rail member 30 by welding at the lower rectangular portion, and the front and rear rectangular portion; if the top rectangular portion is disposed so as to not have sufficient welding access.

FIG. 1 further illustrates a receiver 50 secured to the beam 20. In one exemplary embodiment, the receiver 50 has a portion that extends rearwardly from the beam 20. The receiver 50 may have a connection plate 60 disposed upwardly relative to a socket opening 130 of the receiver 50. The connection plate may be wider than the socket opening 130. In one exemplary embodiment, a first reinforcement member 70 is L-shaped, and one side contacts the connection plate 60, and the other side of the reinforcement member 70 contacts the beam 20.

FIG. 2 illustrates a second reinforcement member 80 that may also be L-shaped, and it may on one leg that may be secured to the receiver 50, and the other leg may be secured to the beam 20. The second reinforcement member 80 may have an aperture that is equally dimensioned or concentric with that of the socket opening 130. The receiver 50, first reinforcement member 70, and second reinforcement member 80 may be one integral unit, or separately connected pieces.

FIG. 3 illustrates a bottom view of the hitch and beam 10. The second reinforcement member 80 may have a bracket aperture 90 that allows access to secure the receiver 50 to the beam 20 via bolts that fasten the connection plate 60 to the beam 20. This bracket aperture 90 may also serve to allow safety chains to be placed through the bracket apertures 90.

Figure 4:
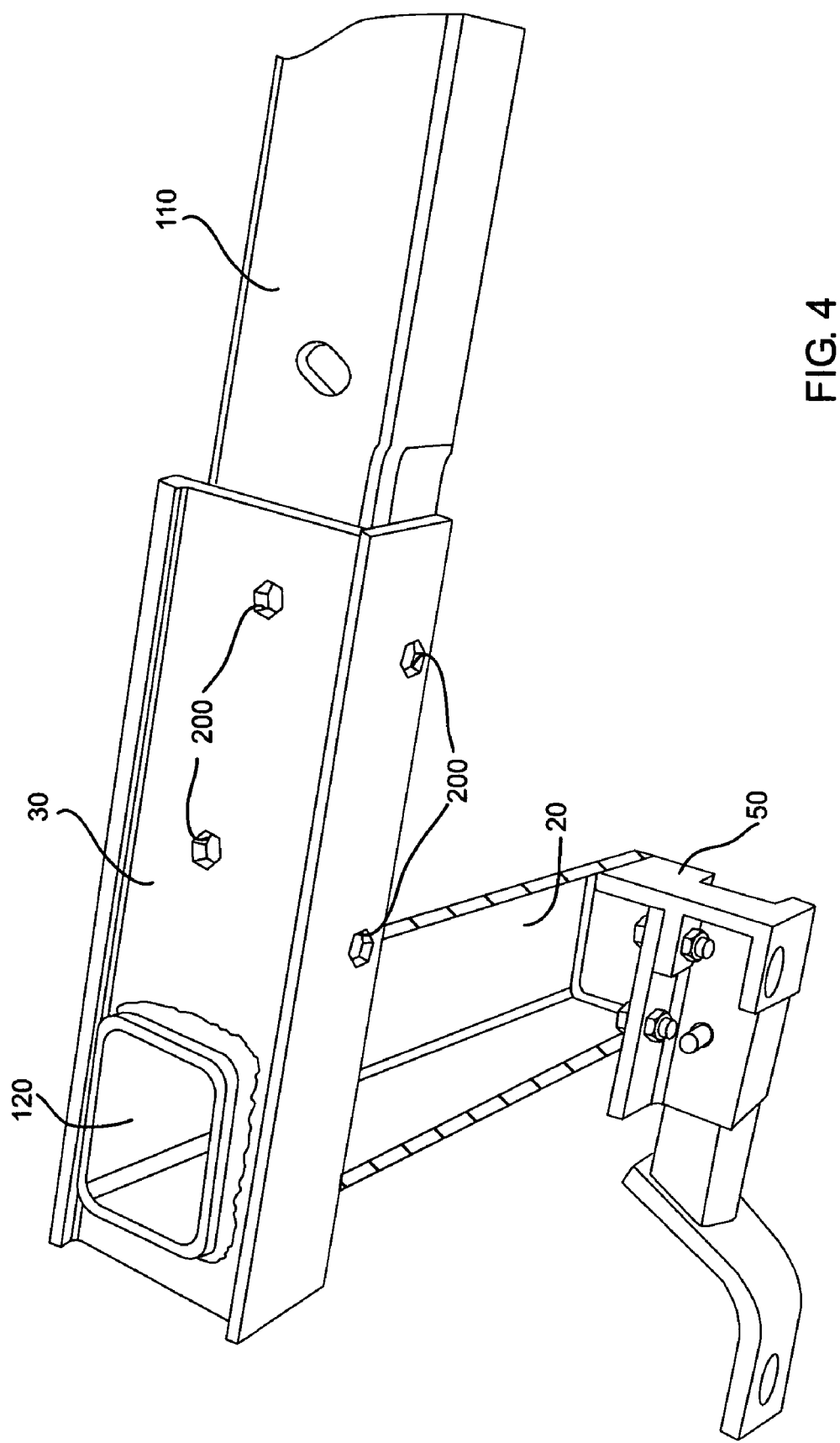
FIG. 4 is a pictorial partial view of an exemplary embodiment of the integral hitch and beam of the present invention.

FIG. 4 illustrates one exemplary embodiment of how the present invention 10 may be secured to the rail 110 of a motor vehicle. In one exemplary embodiment, the rail member 30 may be bolted to the rail 110 of the motor vehicle via vehicle bolt holes 200. FIG. 4 also illustrates how a tongue of member of a trailer may be received by the socket opening 130.

Figure 5:
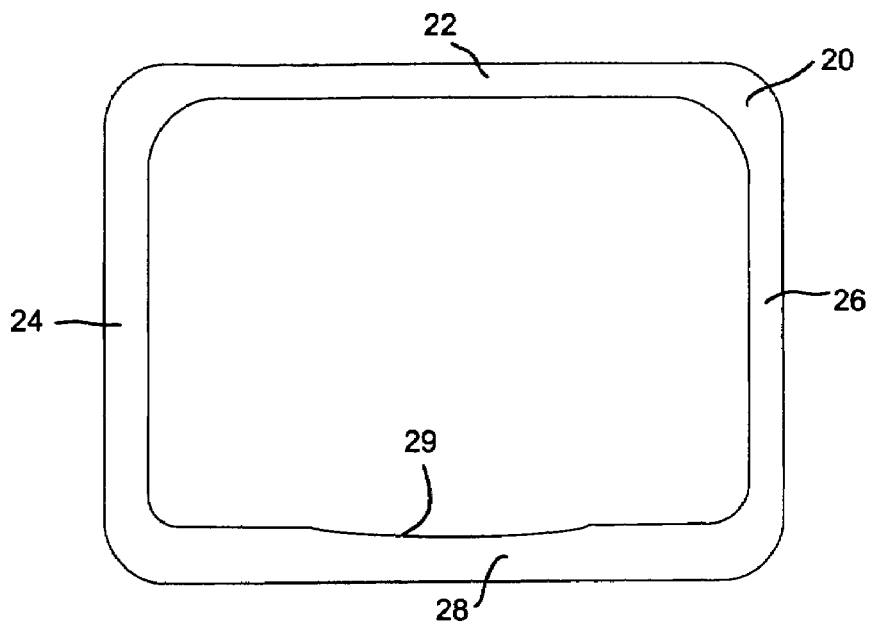
FIG. 5 is a cross-sectional view of a beam of an exemplary embodiment of the integral hitch and beam of the present invention.

FIG. 5 illustrates a cross sectional view of the beam 20. In one exemplary embodiment the beam 20 may have a height of about 88.40 millimeters, and a depth of about 119.00 millimeters. A top portion 22 of the beam 24 may have a thickness of about 6.00 millimeters. A rear portion 24 may have a thickness of about 8.00 millimeters. A front portion 26 may have a thickness of about 6.00 millimeters. A bottom portion 28 may have a thickness of about 10.00 millimeters. In one exemplary embodiment a curved bottom portion 29 may be disposed at the bottom portion 28 of the beam 20. In one exemplary embodiment, the curved bottom portion 29 may have a minimum thickness of about 8.00 millimeters, which may be equidistant from the front portion 26 and rear portion 24.

Figure 6:
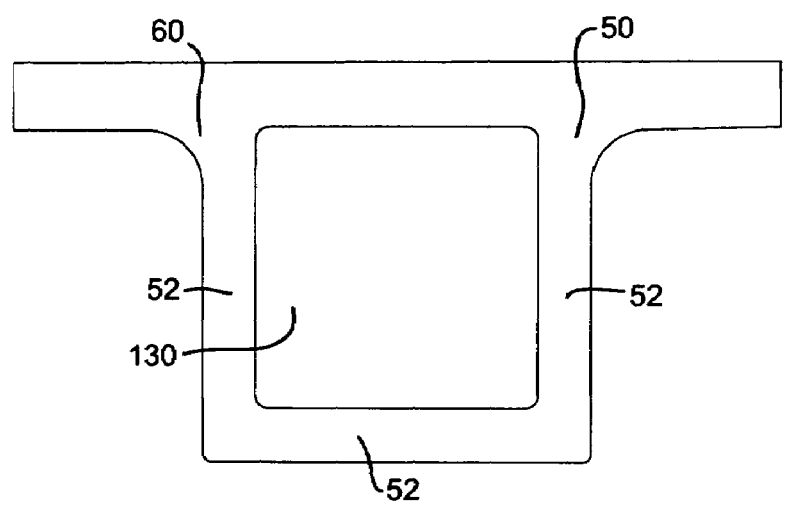
FIG. 6 illustrates a hitch receiver of an exemplary embodiment of the integral hitch and beam of the present invention.

FIG. 6 illustrates the receiver 50, and the socket opening 130. In one exemplary embodiment, the receiver 50 has a connection plate 60 that may have a width of about 142.16 millimeters. The connection plate 60 may have a thickness of about 12.00 millimeters. The receiver 50 may have a height of about 75 millimeters. The receiver 50 may have a width of about 72.16 millimeters. The lower and side walls 52 of the receiver 50 may be about 10.00 millimeters in thickness.

Figure 7A:
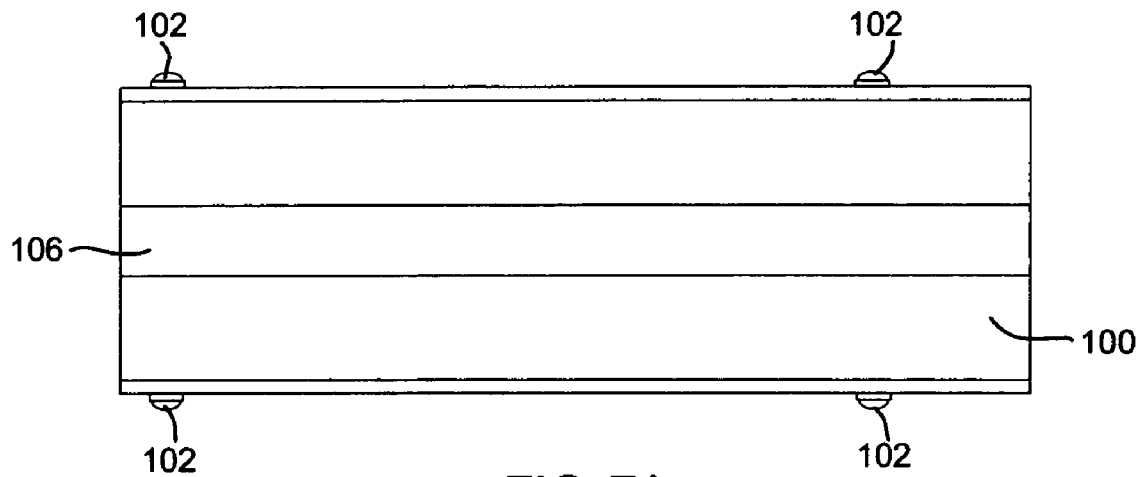
FIGS. 7A-7C are isometric views of the sheath of one exemplary embodiment of the present invention.
Figure 7B:
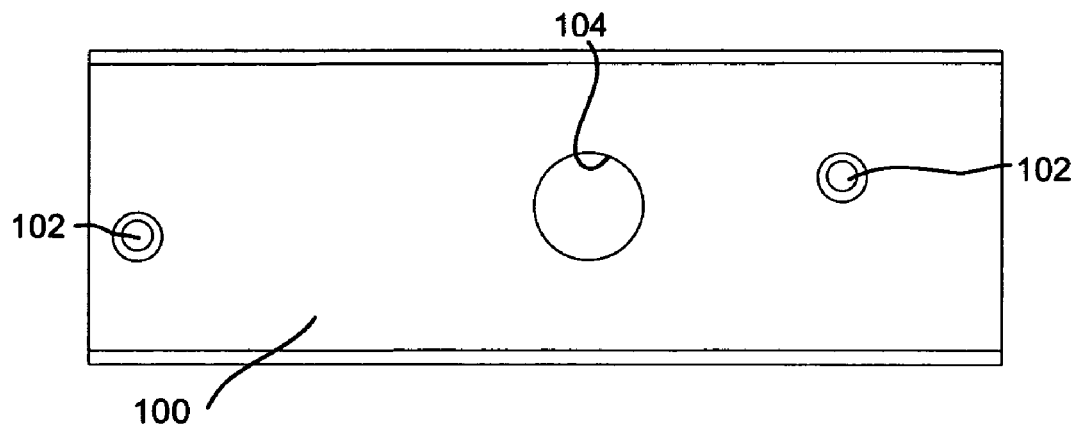
Figure 7C:
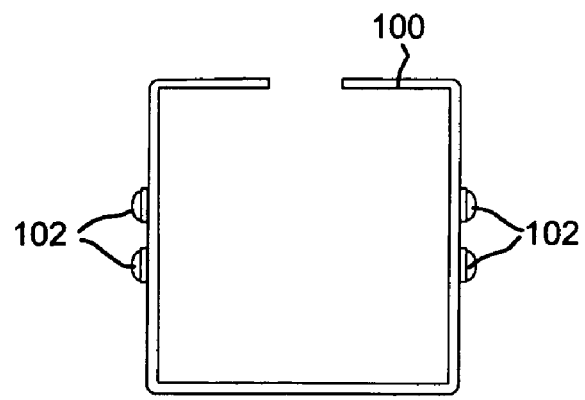

FIG. 7A is a top view of a sheath 100. FIG. 7B is a front view of the sheath 100. FIG. 7C is a right side view of the sheath 100. The sheath 100 may fit within the socket opening 130. To aid in securing the sheath 100 within the socket opening 130, the sheath 100 may have a finger 102 that assists in securing the sheath 100 within the socket opening 130 by the finger 102 mating with a mating aperture of the receiver (not shown). The sheath 100 may have a residual radially outwardly force when disposed within the socket opening 130, which force pushes the fingers 102 into the respective mating aperture of the receiver (not shown), which restricts the axial movement of the sheath 100 relative to the receiver 50. In one exemplary embodiment the sheath 100 may have a length of about 152.50 millimeters, a width of about 52.16 millimeters, and a height of about 53 millimeters. The sheath 100 may have an aperture 104 having a diameter of about 18.00 millimeters. The aperture 104 may be disposed about 69.30 millimeters rearwardly from the front of the sheath 100. The aperture 104 may be disposed about 26.50 millimeters downwardly from the top of the sheath 100. The finger 102 may jut outwardly from the sidewalls of the sheath 100 by a distance of about 2.25 millimeters. In one exemplary embodiment, the sheath 100 may have about 4 fingers 102. In one exemplary embodiment a finger 102 may be disposed about 21.50 millimeters downwardly from the top of the sheath 100, and about 26.50 millimeters rearwardly from the front of the sheath 100. In one exemplary embodiment, a finger 102 may be disposed about 31.50 millimeters downwardly from the top of the sheath 100, and about 144.50 millimeters rearwardly from the front of the sheath 100. The sheath 100 may have a slot 106 running longitudinally along the top of the sheath 100. The slot 106 allows the sheath 100 to be compressed or squeezed, and inserted within the socket opening 130, at which point the sheath 100 will have residual stress that tends to force the sheath 100 to expand radially outwardly, which causes the finger 102 to be secured within a respective mating aperture (not shown) of the socket opening 130. In one exemplary embodiment the slot 106 has a width of about 12.00 millimeters, and has one edge that is disposed about 20.08 millimeters from the left side or left wall of the sheath 100.

Figure 8:
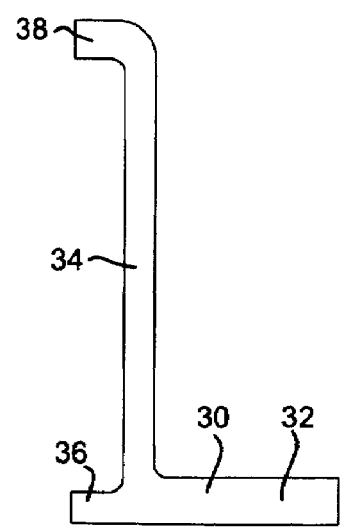
FIG. 8 illustrates a rail member of an exemplary embodiment of the integral hitch and beam of the present invention.

FIG. 8 illustrates the rail member 30. The rail member 30 may have a base portion 32, and a leg 34 extending upwardly therefrom. The rail member may have a lower branch 36 extending leftwardly of the leg 34, and an upper branch 38 extending leftwardly from the leg 34. In one exemplary embodiment, the combined width of the base 32 and the lower branch 36 may be about 67.37 millimeters. The lower branch 36 may extend leftwardly from the left surface of the leg by a distance of about 12.50 millimeters. The base portion 32 may have a height of about 12.00 millimeters. The lower branch 36 may have a height of about 8.00 millimeters. The leg 34 may have a height of about 129.11 millimeters. The upper leg 38 may have a thickness of about 10.00 millimeters. The thickness of the leg 34 may be about 8.00 millimeters.

The present invention is not limited to the cross sectional configurations as illustrated. For example the present invention may comprise a beam 20 of different cross sectional shapes, such as square, polygonal, triangular, and circular.

The present invention may be made from a variety of materials, including but no limited to Al-alloy of AA 6082 T6.

The present invention may withstand loads on the trailer hitch imposed in tension, compression, transverse thrust, upward, and downward forces. In one exemplary embodiment, the present invention may be used for every trailable vehicle up to 10,000 pounds.

The present invention may be made of all aluminum parts. The receiver 50 may be an aluminum extrusion that is cut to length. The receiver 50 may have four holes through the connection plate 60 to secure the receiver 50 to the beam 20. The receiver 50 may accept a trailer coupling bar or tongue such that the interface between both is separated by a steel, spring loaded sheath 100, which may prevent galling between both of the opposing part interfaces.

In one exemplary embodiment, the beam 20 is extruded aluminum having a rectangular cross section, cut to the desired length, depending on the distance between the motor vehicle rails 110. The beam 20 may be welded to the rail members 30 via three weld lines at either end 40 of the beam 20. The rail members 30 may be aluminum extrusions, which have a cross section similar to an I-beam. The rail members 30 can be secured to the beam 20 at two large beam receiving apertures 120 by a weld. These rail members 30 may also be secured to each vehicle rail 110 at four bolt hole locations 200. As shown in FIG. 4, there may be two bolt hole locations 200 on the rail member 30 sidewall, and two 200 on the bottom flange face of the rail member 30.

It should be understood, of course, that the foregoing relates to exemplary embodiments of the invention and that modifications may be made without departing from the spirit and scope of the invention as set forth in the following claims.

We claim:
1. An integral hitch and beam, comprising:
a beam having two end sections;
a rail member securely disposed at each of said end section;

a receiver securely disposed at said beam between said end sections; said receiver disposed downwardly from said beam;

a first reinforcement member secured to said beam and a connection plate;

a second reinforcement member secured to said receiver and said beam;

wherein said second reinforcement member has an aperture that is axially aligned with a bolt hole of said connection plate, whereby said aperture allows access to secure a bolt through said connection plate to said beam, to thereby secure said receiver to said beam.

2. An integral hitch and beam for securing to a vehicle, comprising:

a beam having two end sections;

a rail member having a beam receiving aperture;

a receiver having a connection plate, said connection plate having a bolt aperture, said receiver does not extend rearwardly more than 152.50 millimeters;

a first reinforcement member secured to both said connection plate and said beam; and a second reinforcement member secured to both said receiver and said beam, second reinforcement member having a bracket aperture therethrough, said bracket aperture capable for receiving a safety chain therethrough.

3. The integral hitch and beam of claim 2, wherein said first reinforcement member has a bolt hole aligned with said bracket aperture to allow access to said bolt hole through said bracket aperture, so said connection plate can be secured to said beam by a bolt.

4. The integral hitch and beam of claim 2 wherein said first reinforcement member is welded to said connection plate and said beam.

5. The integral hitch and beam of claim 2 wherein said second reinforcement member is welded to said receiver and said beam.

* * * * *